3,053,888
IODOSOBENZENE ESTERS

Robert E. Miller, Dayton, Ohio, assignor to Monsanto Chemical Company, St. Louis, Mo., a corporation of Delaware
No Drawing. Filed Aug. 17, 1959, Ser. No. 833,915
3 Claims. (Cl. 260—515)

The present invention relates to salts of iodosobenzene and to biological toxicant compositions comprising the same. More particularly the invention provides cyclic salts of iodosobenzene and mono- or dinitro-substituted phthalic acids as new compounds and the method of producing the same. The invention also provides herbicidal compositions comprising the new salts as the essential effective ingredients.

I prepare the iodosobenzene nitrophthalates in good yields by contacting iodosobenzene with a nitrophthalic acid substantially according to the scheme:

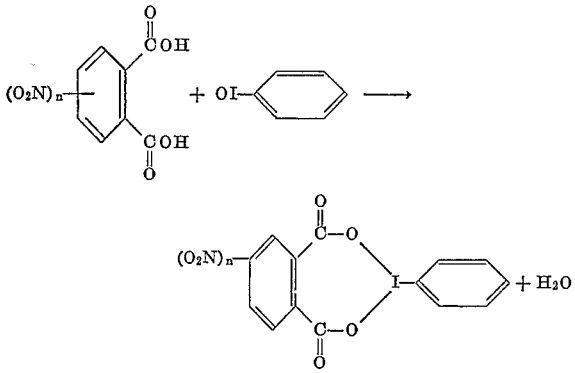

in which $n$ is an integer of from 1 to 2. The iodosobenzene component may be substituted in the benzene ring by one or more alkyl radicals.

Reaction of the iodosobenzene with the nitrophthalic acid is readily effected by mixing the iodosobenzene with said acid at ordinary or increased temperatures and allowing the resulting reaction mixture to stand until formation of the iodosobenzene nitrophthalate has occurred. While depending upon the reaction temperature employed as well as upon the quantities used and degree of agitation, the reaction may be effected in the presence or absence of an inert diluent or solvent, generally I prefer to operate by dissolving one of the reactants in an inert solvent and then adding the other reactant to the resulting solution. As solvents or diluents which are useful for the present purpose there may be mentioned methanol, ethanol, ethyl or isopropyl ether, benzene, toluene, xylene, dioxane, hexane, etc. The reaction may be effected by allowing the reaction mixture of iodosobenzene and nitrophthalic acid to stand at ordinary room temperature; however, in order to effect completion of the reaction within a shorter period of time, heating at, say, a temperature of 50° C.–150° C. depending upon the nature of the diluent as well as the nature of nitrophthalic acid may be used. The iodosobenzene salts of the nitrophthalic acids are readily crystallizable solids which separate from the cooled reaction mixture upon completion of the reaction.

According to the invention iodosobenzene thus reacts with 2-, 3- or 4-nitrophthalic acid to give either the 2-nitrophthalate or the 3-nitrophthalate or the 4-nitrophthalate (cyclic esters) of iodosobenzene; with 2,3-, or 2,4-, or 3,4- or 3,5-, or 2,6-dinitrophthalic acid, iodosobenzene gives the corresponding 2,3-, 2,4-, 3,4-, 3,5-, or 2,6-dinitrophthalate(cyclic salts) of iodosobenzene.

The present iodosobenzene nitrophthalate cyclic salts are stable, well defined crystalline compounds which may be advantageously employed for a variety of commercial and industrial purposes, e.g., as biological toxicants, as oxidizing agents, and as motor fuel additives. They are most advantageously employed, however, as bacteriostats and fungistats.

The invention is further illustrated by, but not limited to, the following examples:

Example 1

3-nitrophthalic acid (4.2 g., 0.02 mole) was dissolved in a mixture of benzene and methanol, 4.0 g. (0.02 mole) of iodosobenzene was added to the resulting solution, and the whole was heated for about ten minutes. The resulting reaction mixture was then allowed to attain room temperature, whereupon crystallization occurred. The crystals which were filtered off comprised the substantially pure 3-nitrophthalate(cyclic salt) of iodosobenzene, M.P. 173.5–174.5° C., of the structure

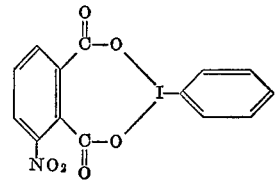

It analyzed as follows:

|  | Found | Calcd. for $C_{14}H_8O_6NI$ |
|---|---|---|
| Percent C | 39.88 | 40.80 |
| Percent H | 2.73 | 1.94 |

Example 2

The fungitoxicity of the nitrophthalate of Example 1 was determined against spores of *Monilinia fructicola*, the casual organism of brown rot of stone fruits. An aqueous suspension containing 1,000 p.p.m. of the test compound was prepared and 0.02 ml. aliquots thereof were pipetted into respective wells of depressed glass slides. Then an 0.1 ml. aliquot of a spore suspension of one of the test organisms was pipetted into each well. The concentration of test chemical in each well was thus 200 p.p.m. The slides were then incubated in moist chambers for 24 hours at a temperature of 25° C. Inspection of the slides at the end of that time showed no spore germination of the organism in wells containing the 200 p.p.m. concentration of the iodosophenzene 3-nitrophthalate whereas profuse germination was noted in "controls," i.e., wells containing the spore suspension in absence of any chemical.

Example 3

This example shows testing of the 3-nitrophthalate-(cyclic salt) of iodosobenzene against the bacterial *Micrococcus pyogenes* var. *aureus* and *Salmonella typhosa*. A 1% stock solution of the nitrophthalate in a non-toxic solvent was added to a nutrient agar to give a test mixture containing 1 part of the compound per 1,000 parts of the agar. Petri dishes were filled with the test mixture and the plates thus prepared were then respectively inoculated with said *pyogenes* and said *typhosa* organisms and incubated for 5 days at a temperature of 25° C. At the end of that time inspection of the plates showed complete inhibition of growth of both the *pyogenes* and the *typhosa* by each of the two test samples, whereas "blank" inoculated agar plates showed profuse growth.

The presently provided iodosobenzene nitrophthalates may be applied as fungicides by any suitable method, for example as sprays or as dusts comprising an inert carrier which may be a liquid or a powdered solid. When used as sprays they may be employed in solution or in emulsion form. I have found that oil-in-water emulsions of said nitrophthalates possess an improved tendency to adhere to the treated organism and that less of the active ingredient is required to give comparable fungitoxicity. The emulsions are readily formulated by first preparing a solution of the ester in an organic solvent and then adding the resulting solution to water containing an emulsifying agent to form an emulsion. Emulsifying agents which may be employed are those customarily used in the art for the preparation of oil-in-water emulsions. The "oil" is here used to designate any organic liquid which is insoluble in water. Examples of emulsifying agents which may be used include alkyl benzene sulfonates, long chain polyalkylene glycols; long chain alkyl sulfosuccinates, etc.

What I claim is:

1. A salt of iodosobenzene of the formula

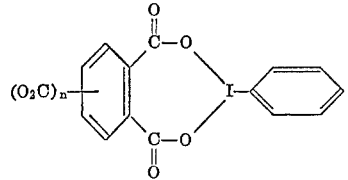

in which $n$ is an integer of from 1 to 2.

2. The mono-nitrophthalate (cyclic salt) of iodosobenzene.

3. The 3-nitrophthalate (cyclic salt) of iodosobenzene.

References Cited in the file of this patent
UNITED STATES PATENTS

| | | |
|---|---|---|
| 2,424,199 | Horst | July 15, 1947 |
| 2,825,738 | Ellendt et al. | Mar. 4, 1958 |
| 2,878,293 | Kinzer | Mar. 17, 1959 |
| 2,884,355 | Goodhue et al. | Apr. 28, 1959 |
| 2,914,554 | Kroeper et al. | Nov. 24, 1959 |
| 2,949,353 | Miller | Aug. 16, 1960 |

OTHER REFERENCES

Sidgwick, "Chemical Elements and Their Compounds," vol. II, pp. 1250, 1952.